United States Patent
Shinozaki

(10) Patent No.: US 7,364,147 B2
(45) Date of Patent: Apr. 29, 2008

(54) WORKPIECE SUPPORT DEVICE

(75) Inventor: Makoto Shinozaki, Tokyo (JP)

(73) Assignee: Koganei Corporation, Tokyo (JP)

( * ) Notice: Subject to any disclaimer, the term of this patent is extended or adjusted under 35 U.S.C. 154(b) by 0 days.

(21) Appl. No.: 11/367,249

(22) Filed: Mar. 3, 2006

(65) Prior Publication Data

US 2006/0202401 A1    Sep. 14, 2006

(30) Foreign Application Priority Data

Mar. 4, 2005    (JP)    ............................. 2005-061372

(51) Int. Cl.
*B25B 5/16*    (2006.01)
(52) U.S. Cl. ........................................ 269/266; 269/32
(58) Field of Classification Search ................ 269/266, 269/32, 24–27
See application file for complete search history.

(56) References Cited

U.S. PATENT DOCUMENTS

| | | | | |
|---|---|---|---|---|
| 4,560,152 A | * | 12/1985 | Miller | ........................ 269/24 |
| 4,799,657 A | * | 1/1989 | Miller | ........................ 269/24 |
| 5,108,079 A | * | 4/1992 | Yonezawa et al. | ............. 269/24 |
| 5,209,153 A | * | 5/1993 | Araki et al. | .................. 91/433 |
| 6,299,151 B1 | * | 10/2001 | Smith | ........................ 269/32 |
| 7,032,897 B2 | * | 4/2006 | Hausler, III | ................. 269/32 |
| 2006/0202401 A1 | * | 9/2006 | Shinozaki | .................... 269/27 |

FOREIGN PATENT DOCUMENTS

| | | |
|---|---|---|
| JP | 3-44534 | 4/1991 |
| JP | 9-225764 | 9/1997 |

* cited by examiner

*Primary Examiner*—Lee D Wilson
(74) *Attorney, Agent, or Firm*—McCormick, Paulding & Huber LLP

(57) ABSTRACT

A projection amount of rod can be adjusted, and workpiece with various shapes or easily deformable workpiece can be stably supported. When an opening/closing valve is switched to an opening position and a working medium flows and is injected from one medium chamber to another medium chamber, a support rod moves upward until an upper face of a first piston abuts on a cover member. Next, when the workpiece is placed on the support rod, the support rod is pushed down. When the workpiece moves downward to a predetermined height, the working medium is prevented from flowing between one medium chamber and another medium chamber if the opening/closing valve is switched to the closing position. Therefore, movement of the support rod is stopped. Since the working medium is sealed in the workpiece support device, it does not leak to the outside.

16 Claims, 4 Drawing Sheets

WORKPIECE SUPPORT DEVICE

CROSS-REFERENCE TO RELATED APPLICATIONS

Applicant hereby claims foreign priority benefits under U.S.C. § 119 from Japanese Patent Application No. 2005-61372 filed on Mar. 4, 2005, the contents of which are incorporated by reference herein.

BACKGROUND OF THE INVENTION

The present invention relates to a workpiece support device capable of adjusting a projection amount of a support rod supporting a workpiece from a support stand.

When predetermined workings such as processing and inspecting are performed to a workpiece such as a material to be processed or a material to be inspected, a workpiece support device capable of supporting a workpiece from a lower side so as not to block such workings is used in some cases. The workpiece support device may have such a constitution that rods abutting on the lower side of the workpiece to support it from the lower side are incorporated reciprocably. Therefore, when the workpiece is supported, the rods are made to project up to a predetermined support spot and the rod can be retracted up to a retreat position after completion of the workings. When the workpiece must be stably supported in its horizontal state due to necessity in the processing or inspecting working or the like, the workpiece may be supported at a plurality of spots by using a plurality of rods. In this case, it is necessary to adjust a support spot, i.e., a projection amount of each rod in accordance with concavity and convexity on each of abutment portions with which the respective rods contact.

Conventionally, a technique as disclosed in Patent Document 1 (Japanese Patent Laid-Open Publication No. 9-225764) is one in which a pad whose bottom face serves as an inclined face is fixed to a base end portion of a rod and a wedge-shaped block arranged on a lower side of the pad is slid along the inclined face of the pad and thereby a projection amount of the rod is adjusted. Additionally, a technique as disclosed in Patent Document 2 (Japanese Utility Model Laid-Open Publication No. 3-44534) is one in which an advance-side pressure chamber is partitioned and formed on a lower end face side of a piston fixed to a rod and the rod is made to project until contact with a workpiece by allowing a flow and injection of hydraulic fluid from an externally disposed hydraulic-fluid supplying portion to the pressure chamber, and a projection amount of the rod is fixed by stopping the supply of the hydraulic fluid after the contact.

According to the technique disclosed in Patent Document 1, since the rod is moved upward or downward by moving horizontally the wedge-shaped block, a space for moving the wedge-shaped block is necessary for being ensured in the horizontal direction, which results in an increase of size of the workpiece support device. Therefore, it is difficult to arrange a plurality of rods at a narrow spacing and it is difficult to support stably the workpiece with significant concavity or convexity or the thin, easily deformable workpiece.

According to the technique disclosed in Patent Document 2, the advance-side pressure chamber and the working oil supplying portion externally disposed are connected to each other by a pipe, and the working oil from the working oil supplying portion via the pipe is made to flow and be injected at the timing of an intention to make the rod project. Therefore, there is a possibility that the working oil will be leaked from a connection portion of the pipe or the like to contaminate a periphery thereof. Also, since the rod pushes up the workpiece from beneath by the hydraulic pressure supplied to the advance-side pressure chamber, support spots for the workpiece fluctuates easily. Accordingly, a thin and easily deformable workpiece may be deformed.

An object of the present invention is to provide a workpiece support device capable of adjusting a projection amount of rod and supporting stably workpieces with various shapes or easily deformable workpieces.

SUMMARY OF THE INVENTION

A workpiece support device according to the present invention comprises: a support stand having a first cylinder chamber in which a first piston is reciprocably accommodated and a second cylinder chamber in which a second piston is reciprocably accommodated; a support rod attached to the first piston so as to project from the support stand; a non-compressible working medium sealed into a first medium chamber partitioned and formed by the first piston and a second medium chamber partitioned and formed by the second piston; a communication path causing the first medium chamber and the second medium chamber to communicate with each other and guide the working medium between the medium chambers; pressing means applying a projection-directional pressing force to the support rod as well as the first and second pistons; and an opening/closing valve having one operating position where the communication path is closed to fix the support rod and the other operating position where the communication path is opened to allow movement of the support rod.

The workpiece support device according to the present invention is such that a plurality of the first cylinder chambers and a plurality of the second cylinder chambers are provided to the support stand, the support rod is attached to each of the first pistons accommodated in the first cylinder chambers, and a workpiece is supported by the plurality of the support rods.

The workpiece support device according to the present invention is such that the opening/closing valve is a spool valve in which a spool is reciprocably mounted in a valve accommodation hole formed so as to communicate with the communication path.

The workpiece support device according to the present invention is such that a first pressing member for applying a projection-directional pressing force to the support rod is incorporated in the first medium chamber, and a second pressing member for applying a projection-directional pressing force to the support rod is provided to the support stand.

According to the present invention, the first piston attached to the support rod which supports the workpiece is provided in the first cylinder chamber while the second piston is provided in the second cylinder chamber. Additionally, a non-compressible working medium is sealed in the medium chamber formed in the first cylinder chamber by the first piston and the second medium chamber formed in the second cylinder chamber by the second piston, and simultaneously both of the medium chambers are caused to communicate with each other via the communication path and the communication path is opened and closed by the opening/closing valve. Therefore, the support rod can be fixed in a state in which the support rod has reached the predetermined projection amount. Accordingly, by changing the projection amount of support rod, each of a plurality of workpieces different in size can be supported by the support rod.

According to the present invention, when a plurality of workpiece support devices are combined, the workpiece can be supported at multiple points by the plurality of support rods. By adjusting the projection amounts of the respective support rods, even a workpiece with a non-flat abutment face or a thin, easily deformable workpiece can be supported stably by the plurality of support rods. Further, by placing the workpiece at the tip portion of the support rod after making the support rod project, the support rod is prevented from pushing up the workpiece from the lower side thereof, so that the supporting position of the workpiece is prevented from fluctuating.

According to the present invention, since there is adapted a structure in which the working medium is sealed inside the workpiece support device, the working medium is prevented from leaking to the outside and contaminating its periphery.

DESCRIPTION OF THE PREFERRED EMBODIMENTS

Figure 1:
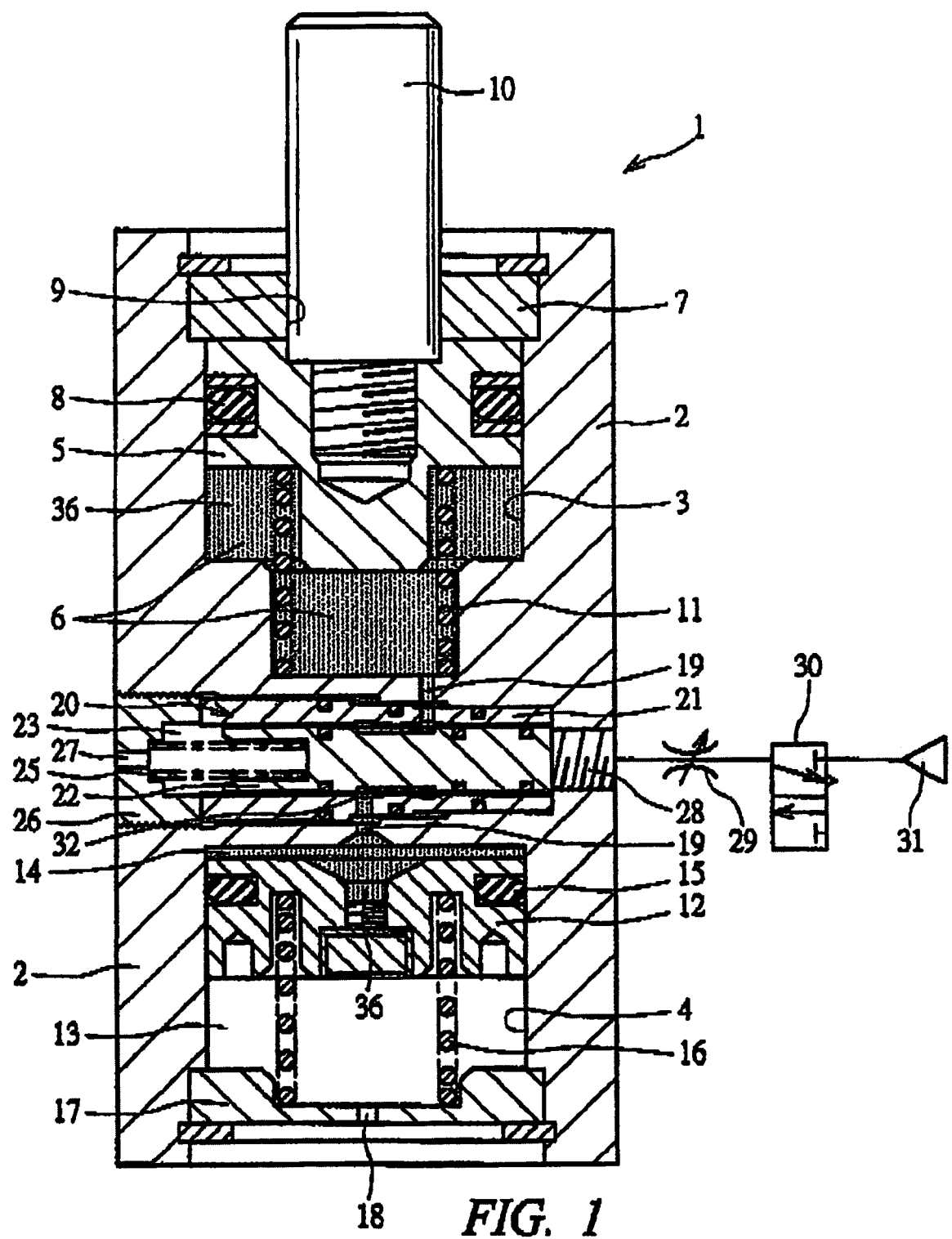
FIG. 1 is a sectional view showing a workpiece support device according to an embodiment of the present invention.
Figure 2:
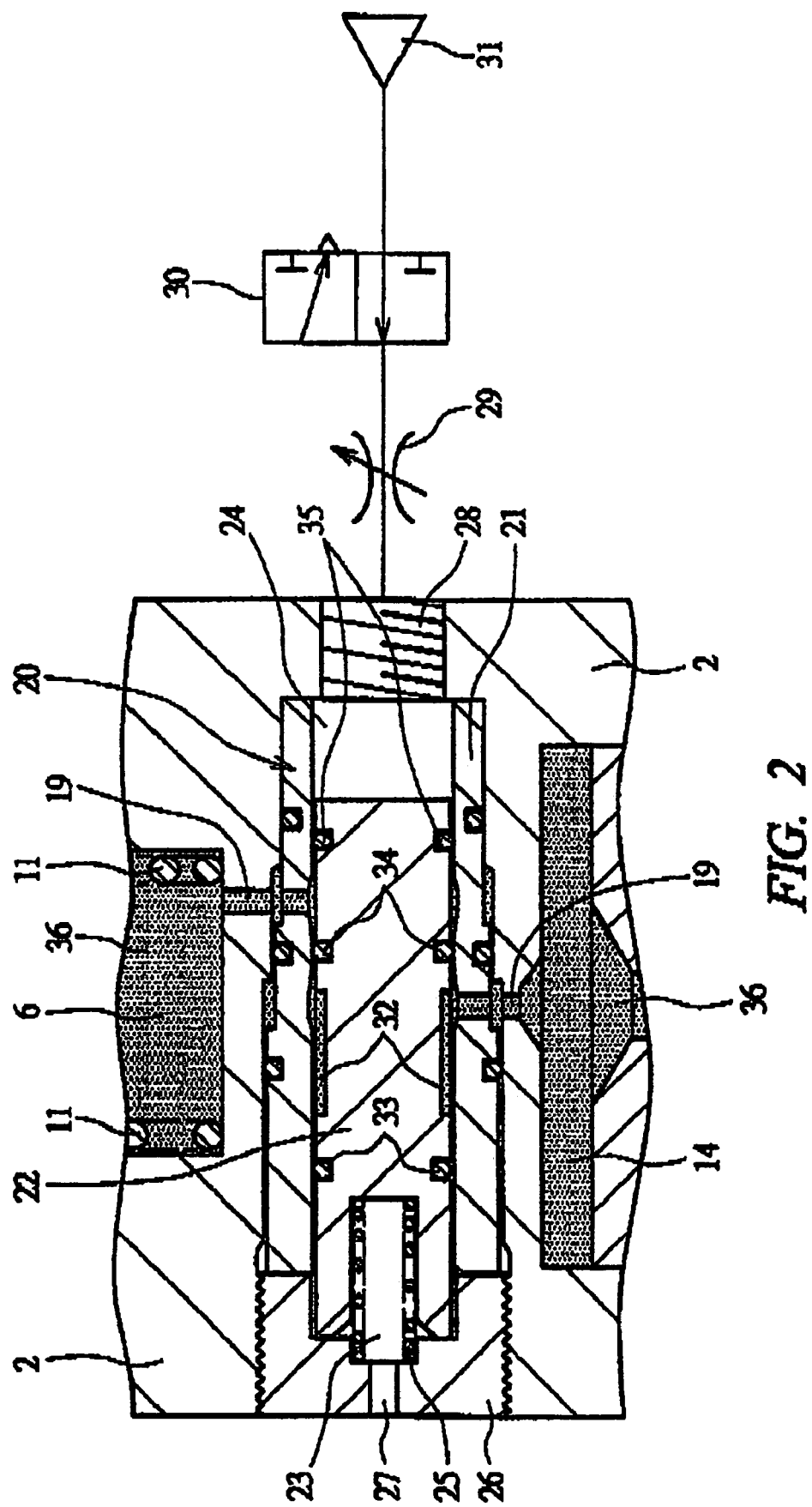
FIG. 2 is an enlarged view showing a state where an opening/closing valve shown in FIG. 1 is moved at a closing position.

FIG. 1 is a sectional view showing a workpiece support device according to an embodiment of the present invention, and FIG. 2 is an enlarged view showing a state where a third piston shown in FIG. 1 has been moved at a closing position.

A workpiece support device 1 has a support stand 2 with a cubic shape, a first cylinder chamber 3 is partitioned and formed at an upper portion of the support stand 2, and a second cylinder chamber 4 is partitioned and formed at a lower portion of the support stand 2.

A first piston 5 is accommodated in the first cylinder chamber 3 so as to be reciprocable vertically, and a first medium chamber 6 serves as a lower end face side of the first piston 5. A bottom face of a cover member 7 fitted for partitioning and forming the first cylinder chamber 3 serves as a stopper face of the first piston 5 for reciprocation and, as shown in FIG. 1, a position where the first piston 5 abuts on the stopper face is set as an advance limit position of the first piston 5. A sealing member 8 is fitted on the first piston 5 so that communication between the first medium chamber 6 and the outside is blocked.

A through hole 9 is formed in the cover member 7, a support rod 10 is incorporated in the through hole 9 so as to be reciprocable vertically, and a base end portion of the support rod 10 is fixed to the first piston 5, so that the support rod 10 also reciprocates integrally with reciprocation of the first piston 5. A tip portion of the support rod 10 abuts on a lower side of an unshown workpiece to support the workpiece on the lower side.

A first pressing member 11, which presses the first piston 5 in a direction of making the tip portion of the support rod 10 project from the support stand 2, is incorporated in the medium chamber 6, and the first pressing member 11 illustrated serves as a compression coil spring, whereby the first piston 5 is such that a pressing force is always biased in a direction of making the support rod 10 project.

A second piston 12 is reciprocably accommodated in the second cylinder chamber 4, and the second piston 12 constitutes a piston pair along with the first piston 5. A spring chamber 13 is located on a lower end face side of the second piston 12, and a medium chamber 14 is located on an upper face side of the second piston 12. A seal member 15 is fitted on the second piston 12 similarly to the first piston 5, so that communication between the spring chamber 13 and the medium chamber 14 is blocked. A second pressing member 16, which presses the second piston 12 in a direction of reducing a volume of the medium chamber 14, is incorporated in the spring chamber 13. The second pressing member 16 illustrated is a compression coil spring similarly to the first pressing member 11, and the second piston 12 is always biased in a direction of reducing a volume of the medium chamber 14. A cover member 17, which partitions and forms the second cylinder chamber 4 and supports the second pressing member 16, is fitted into the support stand 2, and a bleed hole 18 is formed in the cover member 17.

A communication path 19, by which the first medium chamber 6 communicates with the second medium chamber 14 pairing with the first medium chamber 6, is formed in the support stand 2, and an opening/closing value 20 for opening and closing the communication path 19 is further incorporated into the support stand 2. The opening/closing valve 20 is a spool valve having: a sleeve 21 fitted into an attaching hole formed in the support stand 2 so as to cross the communication hole 19; and a spool 22 disposed in a valve accommodating hole of the sleeve 21 so as to be reciprocable axially, wherein the spool 22 can be switched between two positions of an opening position where the two medium chambers 6 and 14 forming a pair are caused to communicate with each other and a closing position where a state of communicating with both medium chambers is blocked. A spring chamber 23 is partitioned and formed on one end face side of the spool 22 and, as shown in FIG. 2, a pressure chamber 24 is partitioned and formed on the other end face side thereof.

As illustrated, a pressing member 25 which presses the spool 22 in a direction of moving the spool 22 at the opening position is incorporated into the spring chamber 23. The pressing member 25 is a compression coil spring like the first and second pressing members 11 and 16, and the spool 22 is always biased in a direction of moving the spool 22 to the opening position by the pressing member 25. A cover member 26, which partitions and forms the spring chamber 23 and abuts on an end face of the spool 22, is fitted into the support stand 2 and a bleed hole 27 is formed in the cover member 26.

A switching port 28 is formed in the pressure chamber 24, and an air pressure source 31 is connected to the switching port 28 via a variable throttle 29 and a switching valve 30. The switching valve 30 can be switched between two positions of a supplying position where compressed air is supplied to the switching port 28 and a supply stopping position where supply of compressed air is stopped and the compression chamber 24 is released to the atmosphere. Therefore, when the switching value 30 is moved at the supplying position, the compressed air is supplied to the compression chamber 24, so that the spool 22 is moved to the closing position against a biasing force of the pressing member 25. On the other hand, when the switching valve 30 is moved at the supply stopping position, the spool 22 is moved to the opening position by a pressing force of the pressing member 25, so that the compressed air in the pressure chamber 24 is discharged to the outside.

A communication groove 32 for ensuring a state of communicating with the communication path 19 at a time of being at the opening position is formed along an outer circumferential face of the spool 22. Seal members 33 and 34 for blocking communication with the communication groove 32 and the spring chamber 23 and that with the communication groove 32 and the pressure chamber 24 are respectively fitted on both sides of the communication groove 32, and a seal member 35 for blocking communication between the communication path 19 and the pressure chamber 24 at a time of being at the closing position is fitted at an end portion of the spool 22.

Thus, non-compressible working media 36 are sealed in the first medium chamber 6, the second medium chamber 14, and the communication path 19 which are put in a state of being blocked from communication with the outside by the seal members 33 to 35. Liquid such as oil is used as the working media 36. Since the working media 36 is sealed in the respective medium chambers 6 and 14 via the communication paths 19, when an external force is, for example, applied to the support rod 10 so that the support rod 10 retracts and the first piston 5 is moved downward to reduce a volume of the medium chamber 6, the working medium corresponding to a reduction amount of the volume flows in the medium chamber 14 to press the second piston 12 and increase a volume of the medium chamber 14. Further, when the external force acting in the direction of retracting the support rod 10 is not applied, a pressing force acting in a direction of making the support rod 10 project is applied to the support rod 10 by the first pressing member 11, and a pressing force acting in the direction of making the support rod 10 project is applied to the support rod 10 via the second piston 12 and the working medium 36 by the second pressing member 16. Therefore, the support rod 10 is advanced in a direction of projecting to the outside of the support stand 2 by the pressing forces. At this time, the working medium 36 inside the second medium chamber 14 flows in the first medium chamber 6. That is, the first and second pistons 5 and 12 forming a pair are moved axially in synchronization with each other by the working medium. Note that even if one of the two pressing members 11 and 16 serving as pressing means is removed, an advance-directional pressing force can be applied to the support rod 10. In addition, by using the spring chamber 13 as a pressure chamber to supply or seal compressed air thereto or therein, compressible fluid such as air is used as pressing means.

Next, an operation of the workpiece support device 1 will be described. When the switching valve 30 is first switched to the stopping position before the workpiece is placed, the compressed air is not supplied to the compression chamber 24 and the spool 22 is switched to the opening position, so that the two medium chambers 6 and 14 forming a pair communicates with each other via the communication path 19. Thereby, the working media 36 can flow in the two medium chambers 6 and 14, and the support rod 10 is advanced by the two pressing members 11 and 16 until the first piston 5 abuts on the cover member 7, and the working medium 36 flows from the medium chamber 14 to the medium chamber 6. At this time, the working media 36 are prevented from flowing to the outside by the seal members 8, 15, and 33 to 35.

When the unshown workpiece is placed on a tip of the support rod 10, the weight of the workpiece itself acts on the support rod 10 in a direction of being against the two pressing members 11 and 16, so that the support rod 10 is pushed down by flowing-in of the working medium 36 from the medium chamber 6 to the medium chamber 14. At this time, if path cross-sectional areas of the communication path 19 and the communication groove 32 are set small, a flow rate per unit time of the working medium 36 is also small, whereby the support rod 10 can be pushed down gradually.

When the support rod 10 is pushed down to a predetermined position, the switching valve 30 is switched to the supplying position (see FIG. 2). Accordingly, the compressed air is supplied to the pressure chamber 24, and the spool 22 is switched to the closing position, so that the communication path 19 is closed and the communication between the two medium chambers 6 and 14 is blocked. Thereby, the working medium 36 cannot flow between the two medium chambers 6 and 14, and movement of the support rod 10 is stopped. At this time, the working medium 36 is prevented from flowing to the outside by the seal members 8, 15, and 33 to 35. Thus, since the switching valve 30 is switched to the supplying position at predetermined timing, the workpiece can be held at predetermined height. After a predetermined working such as a processing or inspecting working performed to the workpiece is completed, when the workpiece is removed from the support rod 10 and the switching valve 30 is switched to the closing position, the working medium 36 can flow between the two medium chambers 6 and 14, whereby the first piston 5 and the support rod 10 can be moved upward to the respective advance limit positions.

Figure 3:
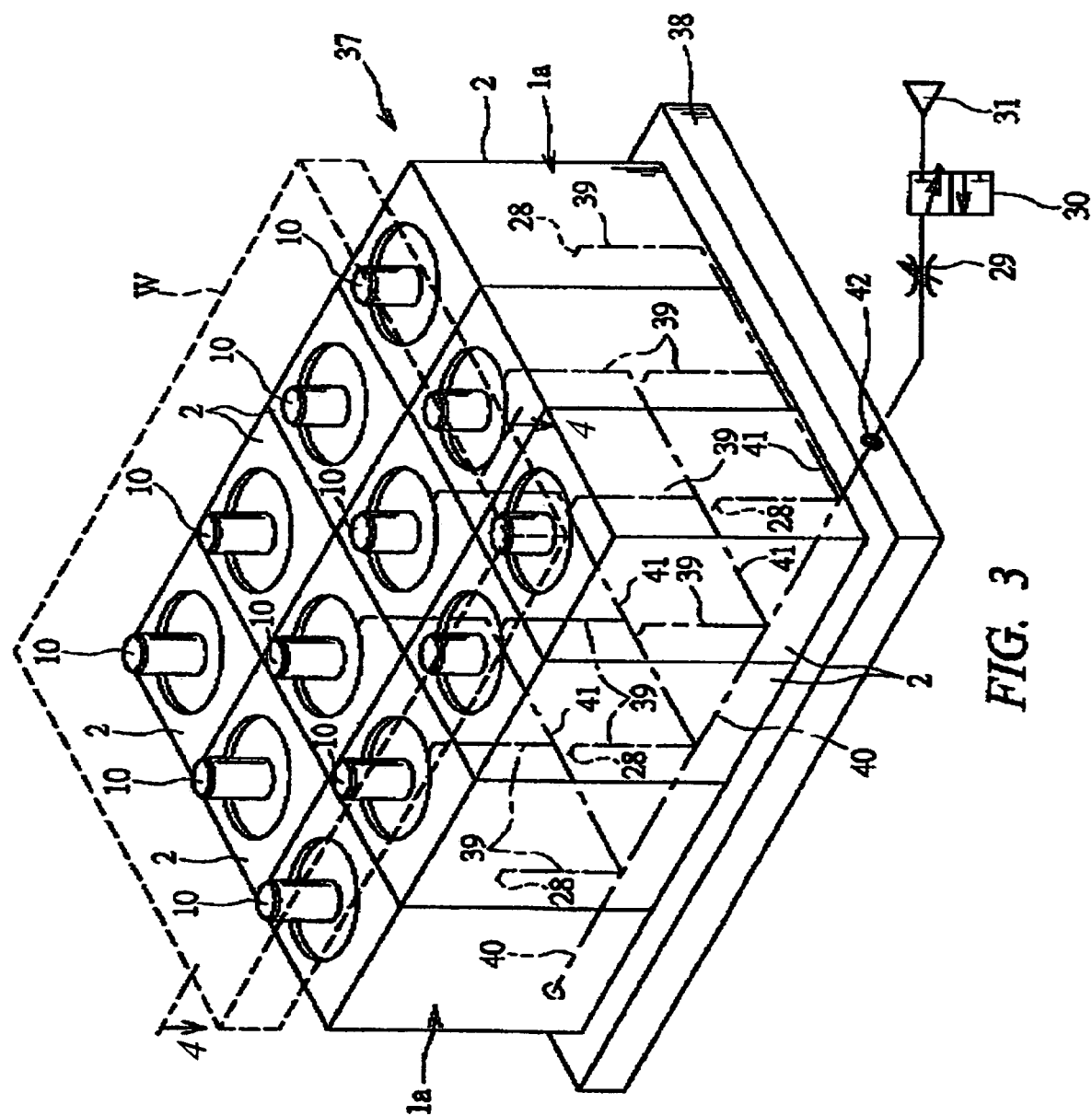
FIG. 3 is a perspective view showing a workpiece support device according to another embodiment of the present invention.
Figure 4:
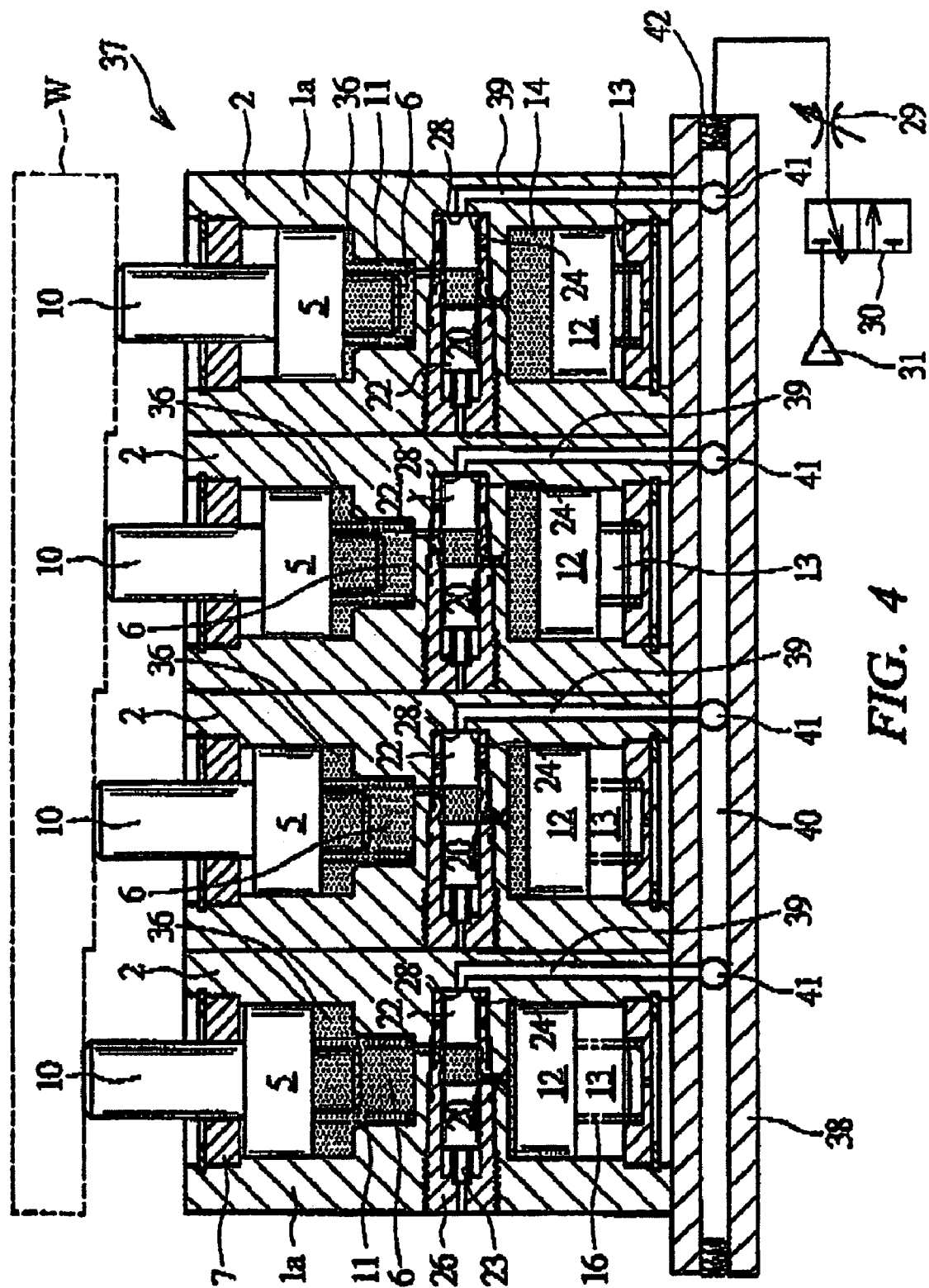
FIG. 4 is a sectional view taken along line A-A shown in FIG. 3.

FIG. 3 is a perspective view showing a workpiece support device according to one embodiment of the present invention, and FIG. 4 is a sectional view taken along line A-A shown in FIG. 3. Note that, in FIGS. 3 and 4, the same members as those shown in FIG. 1 are denoted by the same reference numerals and repetitive explanation thereof will be omitted.

A workpiece support device 37 shown in FIG. 3 is constituted by using the workpiece support device 1 shown in FIG. 1 as one unit 1a and combining a plurality of units 1a, and these units are disposed on a base stand plate 38. A total of twelve units 1a are disposed on the base stand plate 38 in a matrix manner of three rows×four columns. Accordingly, in the workpiece support device 37, twelve piston pairs each including the first piston 5 and the second piston 12 are provided, twelve pairs each including the first and second medium chambers 6 and 14 forming a pair are provided, the working media 36 are sealed in the respective medium chambers 6 and 14 independently, and twelve opening/closing valves 20 are provided so as to correspond to twelve communication paths 19.

The number of units 1a disposed on the base stand plate 38 is shown as one example of the workpiece support device 37, and any number of units 1a can be disposed on the base stand plate 38 in accordance with shape or the like of a workpiece W to be supported. Accordingly, by changing the number of units 1a having approximately the same structure as those of the workpiece support devices 1 to be combined, the workpiece support device 37 with various sizes can be assembled so as to support a workpiece with any size. Incidentally, for example, there may be adopted such a constitution that one block member with a size corresponding to the support stands 2 having the same number as that of units shown in FIG. 3 is used as a common support stand and that the support rods 10, the pistons 5 and 12, and the like which constitute the number of corresponding units 1a are assembled in the one block member. Or, there may be adopted a constitution in which a portion corresponding to the base stand plate 38 is integrally formed on the block member.

Each unit 1*a* in the workpiece support device 37 has the same structure as that of the workpiece support device 1 shown in FIGS. 1 and 2 except that a communication flow path 39 extending from the switching portion 28 toward the base stand plate 38 and being opened at a bottom face of the unit is formed. As shown in FIG. 3, a common flow path 40 opened at a side face of the base stand plate 38, and branch flow paths 41 branched from the common flow path 40 and connected respectively to the communication flow paths 39 are formed in the base stand plate 38, and a common port 42 is formed at one end of the common flow path 40. An air pressure source 31 is connected to the common port 42 via a variable throttle 29 and a switching valve 30, so that by opening the switching valve 30 and supplying the compressed air to the common port 42, the compressed air can be simultaneously supplied to respective compression chambers 24 via the common flow path 40 and the communication flow paths 39. Thus, in the workpiece support device 37 shown in FIGS. 3 and 4, all the opening/closing valves 20 can be operated simultaneously by the one switching valve 30. Note that the other end of the common flow path 40 is sealed by an unshown closing member.

In such a workpiece support device 37, various workpieces W can be supported stably by using a plurality of support rods 10. For example, even if the lower face of the workpiece W, i.e., an abutment face thereof on which the support rods 10 abut changes stepwise in a portion extending along the line A-A, the workpiece W can be supported in such a stable manner that an upper face of the workpiece is kept horizontally by adjusting the respective projection amounts of support rods 10. That is, when the switching valve 30 is switched to the stopping position before the workpiece W is placed on the support rods 10, like the workpiece support device 1 shown in FIG. 1, the compressed air is not supplied to the pressure chambers 24 of the individual units 1*a* and all the twelve spools 22 are switched to the opening positions, so that the respective medium chambers 6 and 14 forming pairs communicate with each other via the communication path 19. Thereby, the working medium 36 flows and is injected from the medium chamber 14 to the respective medium chambers 6, so that the respective support rods 10 project upward to the advance limit positions where the upper faces of the first pistons 5 abut on the respective cover members 7.

Next, when the workpiece W is placed on the tip portions of the support rods 10, the weight of the workpiece itself acts on the support rods 10, so that the respective support rods 10 are pushed down gradually. At this time, the respective support rods 10 are pushed down so as to correspond to the thickness of portions of the workpiece W abutting on the support rods 10. Note that when the workpiece W is placed, the workpiece W may be pushed to the support rods 10 so that a surface of the workpiece becomes horizontal.

As shown in FIG. 4, when the workpiece W moves downward to the predetermined height under such a state that the tip portions of all the support rods 10 abut on the workpiece W, the switching valve 30 is switched to the supplying position. Thereby, the working medium 36 cannot flow between the medium chamber 6 and the medium chamber 14 forming a pair, and movement of the respective support rods 10 is stopped, so that the workpiece W can be supported stably by using the plurality of support rods 10.

After the predetermined working performed to the workpiece W is completed, when the workpiece W is removed from the support rods 10 and the switching valve 30 is switched to the closing position, the first positions 5 and the support rods 10 can be moved upward to the advance limit positions, respectively.

The present invention is not limited to the above embodiments and, needless to say, may be variously modified and altered within the scope of not departing from the gist of the invention. For example, a switching operation of the spool 22 may be performed by using hydraulic pressure instead of compressed air. In the above embodiments, the second piston 12 is accommodated so as to be reciprocable vertically, but may be accommodated so as to be reciprocable horizontally. On the other hand, the spool 22 is accommodated so as to be reciprocable horizontally, but may be accommodated so as to be reciprocable vertically.

In the above embodiments, the pressing member 25 is incorporated in the spring chamber 23, but the spool 22 may be pressed by supplying compressed air into the spring chamber 23. At this time, a pressing member such as a coil spring may be incorporated into the pressure chamber 24. Additionally, the spool 22 may be reciprocable by supplying negative pressure to the spring chamber.

What is claimed is:

1. A workpiece support device comprising:
    a support stand having a first cylinder chamber in which a first piston is reciprocably accommodated and a second cylinder chamber in which a second piston is reciprocably accommodated;
    a support rod attached to the first piston so as to project from the support stand;
    a non-compressible working medium sealed in a first medium chamber partitioned and formed by the first piston and a second medium chamber partitioned and formed by the second piston;
    a communication path causing the first medium chamber and the second medium chamber to communicate with each other and guide the working medium between the medium chambers, the communication path being within the support stand and forming a sealed, constant volume system with the first and second medium chambers;
    pressing means applying a projection-directional pressing force to the support rod as well as the first and second pistons; and
    an opening/closing valve positioned in the communication path between the first medium chamber and the second medium chamber, and having one operating position where the communication path is closed to fix the support rod and another operating position where the communication path is opened to allow movement of the support rod.

2. The workpiece support device according to claim 1, wherein a plurality of the first cylinder chambers with first pistons, a corresponding plurality of support rods and a plurality of the second cylinder chambers are provided in the support stand, each support rod of the plurality being attached to a respective one of the plurality of first pistons accommodated in the first cylinder chambers, whereby a workpiece can be supported by the plurality of the support rods.

3. The workpiece support device according to claim 2, wherein an open/closing valve is provided in each communication path between the respective first and second medium chambers, and each opening/closing valve is a spool valve in which a spool is reciprocably mounted in a valve accommodation hole formed so as to communicate with the communication path.

4. The workpiece support device according to claim 3, wherein a pressing means is included in each of the plurality of first and second cylinder chambers, and in each first and second cylinder chamber a first pressing member for applying a projection-directional pressing force to the support rod is incorporated in the first medium chamber, and a second pressing member for applying a projection-directional pressing force to the support rod is provided in the support stand.

5. The workpiece support device according to claim 2, wherein a pressing means is included in each of the plurality of first and second cylinder chambers, and in each first and second cylinder chamber a first pressing member for applying a projection-directional pressing force to the support rod is incorporated in the first medium chamber, and a second pressing member for applying a projection-directional pressing force to the support rod is provided in the support stand.

6. The workpiece support device according to claim 1, wherein the opening/closing valve is a spool valve in which a spool is reciprocably mounted in a valve accommodation hole formed so as to communicate with the communication path.

7. The workpiece support device according to claim 6, wherein the pressing means includes a first pressing member for applying a projection-directional pressing force to the support rod in the first medium chamber, and a second pressing member for applying a projection-directional pressing force to the support rod in the support stand.

8. The workpiece support device according to claim 1, wherein the pressure means includes a first pressing member for applying a projection-directional pressing force to the support rod in the first medium chamber, and a second pressing member for applying a projection-directional pressing force to the support rod in the support stand.

9. A workpiece support device comprising:
a support stand having a first cylinder chamber in which a first piston is reciprocably accommodated and a second cylinder chamber in which a second piston is reciprocably accommodated;
a support rod attached to the first piston so as to project from the support stand;
a non-compressible working medium in a first medium chamber partitioned and formed by the first piston and a second medium chamber partitioned and formed by the second piston;
a communication path causing the first medium chamber and the second medium chamber to communicate with each other and guide the working medium between the medium chambers, the communication path being within the support stand and forming a sealed, constant volume system with the first and second medium chambers;
pressing means applying a projection-directional pressing force to the support rod as well as the first and second pistons; and
an opening/closing valve positioned in the communication path between the first medium chamber and the second medium chamber, and having one operating position where the communication path is closed to fix the support rod and another operating position where the communication path is opened to allow movement of the support rod,
wherein the first and second pistons move synchronously with one another from the first to the second operating position.

10. The workpiece support device according to claim 9, wherein a plurality of the first cylinder chambers with first pistons and a corresponding plurality of support rods and a plurality of the second cylinder chambers are provided in the support stand, each support rod of the plurality being attached to a respective one of the plurality of first pistons accommodated in the first cylinder chambers, whereby a workpiece can be supported by the plurality of the support rods.

11. The workpiece support device according to claim 10, wherein an open/closing valve is provided in each communication path between the respective first and second medium chambers, and each opening/closing valve is a spool valve in which a spool is reciprocably mounted in a valve accommodation hole formed so as to communicate with the communication path.

12. The workpiece support device according to claim 11, wherein a pressing means is included in each of the plurality of first and second cylinder chambers, and in each first and second cylinder chamber a first pressing member for applying a projection-directional pressing force to the support rod is incorporated in the first medium chamber, and a second pressing member for applying a projection-directional pressing force to the support rod is provided in the support stand.

13. The workpiece support device according to claim 10, wherein a pressing means is included in each of the plurality of first and second cylinder chambers, and in each first and second cylinder chamber a first pressing member for applying a projection-directional pressing force to the support rod is incorporated in the first medium chamber, and a second pressing member for applying a projection-directional pressing force to the support rod is provided in the support stand.

14. The workpiece support device according to claim 9, wherein the opening/closing valve is a spool valve in which a spool is reciprocably mounted in a valve accommodation hole formed so as to communicate with the communication path.

15. The workpiece support device according to claim 14, wherein the pressing means includes a first pressing member for applying a projection-directional pressing force to the support rod in the first medium chamber, and a second pressing member for applying a projection-directional pressing force to the support rod in the support stand.

16. The workpiece support device according to claim 9, wherein the pressure means includes a first pressing member for applying a projection-directional pressing force to the support rod in the first medium chamber, and a second pressing member for applying a projection-directional pressing force to the support rod in the support stand.

* * * * *